(12) United States Patent
Trask

(10) Patent No.: US 6,249,355 B1
(45) Date of Patent: Jun. 19, 2001

(54) SYSTEM PROVIDING HYBRID HALFTONE

(75) Inventor: Jeffrey L. Trask, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/181,226

(22) Filed: Oct. 26, 1998

(51) Int. Cl.$^7$ .......................... H04N 1/405; H04N 1/409; H04N 1/52
(52) U.S. Cl. .......................... 358/1.9; 358/533; 358/536; 358/454; 358/456; 358/460
(58) Field of Search .......................... 358/1.9, 533, 534, 358/535, 536, 454, 456, 457, 458, 459, 460, 466, 298; 382/237, 270, 275

(56) References Cited

U.S. PATENT DOCUMENTS

| | | | |
|---|---|---|---|
| 4,924,301 | * 5/1990 | Surbrook | 358/534 |
| 5,155,599 | 10/1992 | Delabastita | 358/298 |
| 5,235,435 | * 8/1993 | Schiller | 358/456 |
| 5,381,247 | 1/1995 | Hains | 358/533 |
| 5,739,842 | 4/1998 | Murata . | |
| 5,766,807 | 6/1998 | Delabastita et al. . | |
| 5,774,229 | 6/1998 | Delabastita | 358/298 |
| 5,808,755 | 9/1998 | Delabastita | 358/454 |

OTHER PUBLICATIONS

Evolution of Halftoning Technology in the Unites States Patent Literature; Journal of Electronic Imaging (Jul. 1994); Peter R. Jones; pp. 257–275.

* cited by examiner

Primary Examiner—Scott Rogers

(57) ABSTRACT

A system provides a halftone image having reduced moire patterns by applying a screen function of the type having a first function exhibiting symmetry about a point and a second function exhibiting symmetry about a line. In a progression of tone levels, such a screen function creates first dots, then lines, then dots. For example, a screen function may include the sum of a first function of the type $(1-\cos(pi*(x+y)))*\cos(pi*(y-x)))$ and a second function being a piecewise linear function of x, where $\{x,y\}$ is a coordinate location in a unit cell mapped to a halftone cell mapped to the image pixel grid. In other embodiments, a unit cell is defined on the grid by a vector. The vector has a component along an axis of the grid. The component has a noninteger length. Unit cells of the type so defined implement rational tangent angles not possible with conventional halftone cells.

27 Claims, 12 Drawing Sheets

300 → HALFTONE POSITION

| TONE LEVEL | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 68 | 0 | 0 | 0 | 0 | 0 | 0 |
| 2 | 0 | 0 | 0 | 0 | 0 | 0 | 1 | 0 | 0 | 0 | 83 | 0 | 0 | 0 | 1 | 0 | 0 |
| 3 | 0 | 0 | 0 | 0 | 0 | 0 | 2 | 0 | 0 | 0 | 98 | 0 | 0 | 0 | 2 | 0 | 0 |
| 4 | 0 | 0 | 0 | 0 | 0 | 0 | 5 | 0 | 0 | 0 | 109 | 0 | 0 | 0 | 5 | 0 | 0 |
| ⋮ 310 | | | | | | | | | | | | | | | | | |
| 63 | 0 | 2 | 2 | 0 | 0 | 24 | 173 | 0 | 0 | 39 | 254 | 39 | 0 | 0 | 173 | 24 | 0 |
| 64 | 0 | 3 | 3 | 0 | 0 | 26 | 174 | 0 | 0 | 43 | 254 | 44 | 0 | 0 | 174 | 26 | 0 |
| 65 | 0 | 5 | 5 | 0 | 0 | 27 | 176 | 0 | 0 | 47 | 254 | 47 | 0 | 0 | 176 | 27 | 0 |
| ⋮ 312 | | | | | | | | | | | | | | | | | |
| 127 | 0 | 142 | 142 | 0 | 0 | 123 | 246 | 39 | 0 | 130 | 254 | 130 | 0 | 39 | 246 | 123 | 0 |
| 128 | 0 | 143 | 143 | 0 | 0 | 125 | 247 | 41 | 0 | 132 | 254 | 132 | 0 | 41 | 247 | 126 | 0 |
| 129 | 0 | 145 | 145 | 0 | 0 | 126 | 247 | 42 | 0 | 137 | 254 | 137 | 0 | 42 | 247 | 126 | 0 |
| ⋮ 314 | | | | | | | | | | | | | | | | | |
| 191 | 19 | 247 | 247 | 19 | 0 | 236 | 255 | 185 | 27 | 254 | 255 | 255 | 27 | 185 | 255 | 236 | 0 |
| 192 | 19 | 248 | 248 | 19 | 0 | 236 | 255 | 189 | 30 | 254 | 255 | 255 | 31 | 189 | 255 | 236 | 0 |
| 193 | 19 | 249 | 249 | 19 | 0 | 237 | 255 | 189 | 37 | 254 | 255 | 255 | 37 | 189 | 255 | 237 | 0 |
| ⋮ 316 | | | | | | | | | | | | | | | | | |
| 254 | 252 | 255 | 255 | 252 | 249 | 255 | 255 | 255 | 255 | 255 | 255 | 255 | 255 | 255 | 255 | 255 | 250 |
| 255 | 255 | 255 | 255 | 255 | 255 | 255 | 255 | 255 | 255 | 255 | 255 | 255 | 255 | 255 | 255 | 255 | 255 |

FIG. 3

SYSTEM PROVIDING HYBRID HALFTONE

FIELD OF THE INVENTION

Embodiments of the present invention relate to systems that provide a halftone image and to methods of providing a halftone image.

BACKGROUND OF THE INVENTION

A halftone image may be prepared by a conventional computer, laser printer, copier, or facsimile machine by digital computation and then may be stored in whole or in part prior to transferring the image to a tangible medium such as printable media, film, or a printing plate. A halftone image is composed of output picture elements (pixels). A halftone image is generally prepared to satisfy a limitation of the media or of the transfer process that prohibits the formation of an output pixel having an analog intensity level.

Preparation of a halftone image using the conventional clustered dot technique includes grouping output pixels to form a halftone dot that varies in size and proximity to other halftone dots to convey analog pixel intensity information (e.g., a shade of grey) that cannot be conveyed by varying output pixel intensity. Output pixels generally have a binary intensity (e.g., black when printed or white when not printed). Translation by digital computation usually introduces some quantization and possibly inaccurate variation of halftone dot size and placement. When a halftone image is transferred to tangible media, variation in halftone dot size and placement (such as introduced by a mechanical system) as well as any effects of quantization and inaccuracy may give rise to patterns generally known as moire patterns. For example, a large area of the same color in the original may have a pattern of objectionable variation in color.

In a conventional four color printing process, for example, halftone images prepared for each component color by known techniques can produce objectionable moire patterns when overlaid, one atop the other. These patterns are especially noticeable when transfer to media involves minor misregistration of the component halftone images. Because any of a large number of causes of misregistration often develop either during manufacture or during use of a conventional color printer, a need remains for systems and methods for preparing halftone images that are less prone to produce objectionable moire patterns upon minor misregistration.

Without an improved halftone preparation technique, comparatively inexpensive printing systems (e.g., having output pixel densities of a few hundred pixels per inch) cannot be used to supply accurate and moire-free graphic images on tangible media. The demand for such images is currently met in part by more expensive printing systems having output pixel densities of a few thousand pixels per inch. The demand for such images is expected to increase as the cost per image declines. These market demands intensify the need for systems that provide a halftone image and for methods of providing a halftone image.

SUMMARY OF THE INVENTION

A system, according to various aspects of the present invention, for providing a hybrid halftone image includes a memory device and a formatter. The memory device provides a plurality of input pixel values and a plurality of output pixel geometry values. Each output pixel geometry value is identified to a respective output pixel position and is defined in accordance with a hybrid screen function. The formatter performs a method for providing the hybrid halftone image. The method is performed for each input pixel value of the plurality. The method includes the steps of (a) reading a respective input pixel value from the memory device; (b) determining a respective output pixel position; (c) reading, in response to the respective input pixel value and the respective output pixel position, a respective output pixel geometry value from the memory device; and (d) providing a respective portion of the hybrid halftone image at the respective output pixel position in accordance with the respective output pixel geometry value.

Output pixel geometry values that are provided in response to a hybrid screen function provide more reliable rendering of halftone dots in the presence of scanner run-out. Reliability includes consistency throughout an image and consistency from one image to another.

A system, according to various aspects of the present invention, provides a halftone image to be rendered on a grid of output pixels. The halftone image is provided in response to a plurality of input pixel values. The system includes a memory device and a formatter. The memory device provides a plurality of output pixel geometry values. Each output pixel geometry value is identified to a respective halftone position in a respective halftone cell. Each output pixel geometry value is defined in accordance with a screen function for providing a respective output pixel geometry value in accordance with the respective halftone position. Each respective halftone cell is defined by a vector having a component along an axis of the grid, the component having a length being a noninteger multiple of the pitch of the grid. The formatter performs a method for providing the halftone image, the method being performed for each input pixel value of the plurality. The method includes the steps of (a) determining a respective output pixel position; (b) reading, in response to a respective input pixel value and the respective output pixel position, a respective output pixel geometry value from the memory device; and (c) providing a respective portion of the halftone image at the respective output pixel position in accordance with the respective output pixel geometry value.

Output pixel geometry values that are provided in response to an off-grid halftone cell provide less noticeable moire.

BRIEF DESCRIPTION OF THE DRAWING

Embodiments of the present invention will now be further described with reference to the drawing, wherein like designations denote like elements, and:

FIG. 3 is a data structure diagram of the output pixel geometry table of FIG. 2;

DETAILED DESCRIPTION OF THE PREFERRED EMBODIMENT

Figure 1:
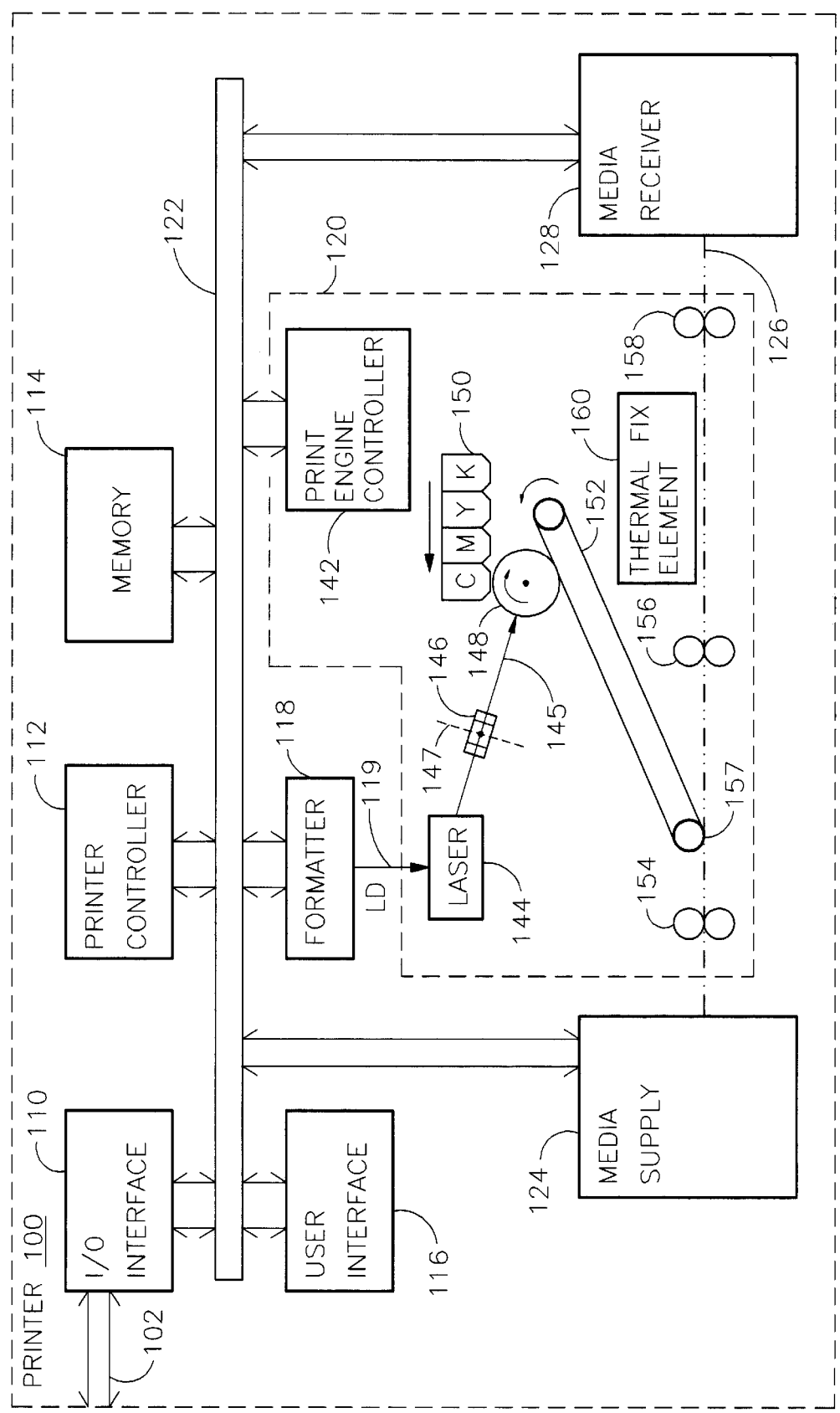
FIG. 1 is a functional block diagram of a printer according to various aspects of the present invention.

A system of the present invention includes any system for providing a hybrid halftone image. A hybrid halftone image provided by such a system in digital format may be stored in a memory device or communicated by a signal in serial or in parallel. When a hybrid halftone image is to be transferred to a tangible medium, the system may include additional functions such as electrophotographic printing. For example, a printer according to various aspects of the present invention primarily includes an interface for receiving a description of data to be printed, a bus for communicating the data to a formatter, a paper path including a print engine for handling paper and for printing a halftone image on the paper as provided by the formatter. More particularly, exemplary printer 100 of FIG. 1 includes I/O interface 110, printer controller 112, memory 114, user interface 116, formatter 118, print engine 120, bus 122, media supply 124, paper path 126, and media receiver 128.

An I/O interface couples a printer to a computer network or computer system for receiving a description of data to be printed. An I/O interface includes circuits for receiving commands and data to be printed and for providing status of printer operation. For example, I/O interface 110 couples printer 100 to a network via line 102 and includes any conventional circuits for receiving command messages and data messages and for providing status messages according to various conventional protocols (e.g., PCL protocol marketed by Hewlett Packard Co.).

A user interface provides controls and displays that facilitate operator interaction with the printer. For example, user interface 116 includes conventional circuits for various control switches (or a keyboard), an alphanumeric/graphic display, and various discrete indicators. Control switches may include, for example, on-line and reset. Displays may include, for example, paper status (e.g., empty, jammed) and protocol status.

A printer controller provides overall control of printing functions including preparation of commands for the formatter, print engine, and user interface in response to commands received via the I/O interface. For example, printer controller 112 includes a conventional microprocessor circuit programmed to perform methods including, for example, receiving and sending messages via bus 122 and I/O interface 110, sensing operator controls and providing operator information displays via bus 122 and user interface 116, and controlling the cooperation of formatter 118 and print engine 120 by receiving status from each via bus 122 and commanding a sequence of operations to accomplish image formation and printing.

A memory provides storage for program instructions, constants, and variables. For example, memory 114 includes conventional memory devices (e.g., semiconductor or magnetic disk), and may include nonvolatile memory devices (e.g., EEPROM or CDROM). Constants and variables include tables of information organized as data structures, indexed in any convenient manner. For example, an input bit map, color table, output pixel geometry table, or halftone image buffer discussed below may be organized, stored, and accessed using one or more data structures, arrays, linked lists, files, or FIFO buffers.

Bus 122 is primarily controlled by printer controller 112 and includes a conventional parallel digital communication bus. Printer controller 112 communicates via bus 122 in a conventional manner with I/O interface 110, user interface 116, memory 114, formatter 118, print engine 120, media supply 124, and media receiver 128 by sending commands and receiving status.

The paper path of a printer includes various conventional sensors and media handling devices for passing roll or sheet media from a media supply through the print engine to a media receiver. Any conventional media may be used including, for example, paper, transparency, film, or a plate for use in another printing process. For example, paper path 126 extends from media supply 124, passes through media handler 154, comes in contact with transfer belt 152 at point 157, passes through media handler 156, passes by thermal fix element 160, passes through media handler 158, and extends into media receiver 128. The temperature, humidity, orientation, media sheet counting, and media type verification, are monitored and controller by electronics (not shown) in print engine 120 associated with various positions along paper path 126.

Media supply responds to conventional commands from printer controller 112 to provide sheet media or advance roll media as requested. Media receiver 128 provides post-printing functions affecting media, for example, stapling, hole punching, gluing, stitching, or other media finishing operations.

A print engine includes any conventional mechanism for forming an image on media. For example, print engine 120 receives commands directing printing operations from bus 122 and includes a suitable electrophotographic printing mechanism for printing text and graphics on paper. Print engine 120 prints graphics, according to various aspects of the present invention, by printing one or more hybrid halftone images. Print engine 120 includes print engine controller 142, laser 144, rotating mirror 146, photoconductive drum 148, toner dispensers 150, transfer belt 152, thermal fix element 160, and media handlers 154, 156, and 158.

A print engine controller includes any conventional circuit for coupling a print engine to a communication bus for receiving control messages and providing status messages. For example, print engine controller 142 includes a conventional microprocessor based control circuit for controlling various power supplies and motors, and for coordinating the sequence of operations that result in the transfer of a hybrid halftone image onto media.

To form a hybrid halftone image on media, print engine 120 performs a conventional electrophotographic printing process in response to laser drive signal LD conveyed from formatter 118 to print engine 120 on line 119. Laser drive signal LD conveys in serial a hybrid halftone image in digital format. Laser 144 receives signal LD and provides modulated laser light (e.g. on/off modulation) directed toward rotating mirror 146. Rotating mirror 146 includes a six-faceted mirror assembly that rotates on axis 147 so that modulated laser light forms beam 145 that scans across the length of photoconductive drum 148. Photoconductive drum 148 holds an electrostatic charge distributed on the surface of the drum. As drum 148 rotates on its lengthwise axis (not shown) each scan depletes a portion of this charge in accordance with the laser modulation. Each such portion is developed by the deposition of toner from toner dispensers 150 onto drum 148. Dispensed toner is transferred from drum 148 to transfer belt 152 and then from transfer belt 152 to media at point 157. Thermal fix element 160 applies heat to fix the toner to the media.

Color printing, according to various aspects of the present invention, may be accomplished by sequentially forming four separate hybrid halftone images on photoconductive drum 148, one for each color: cyan, magenta, yellow, and black (CMYK). After each image is written onto drum 148, a suitable toner is dispensed and transferred to transfer belt 152. The drum is then initialized for a subsequent image. When toner for all four images has been transferred to belt 152, toner is then transferred onto media at point 157 and fixed by thermal fix element 160.

A formatter, according to various aspects of the present invention, includes any circuit for providing data that defines a hybrid halftone image. For example, formatter 118 includes a conventional microprocessor circuit that cooperates with memory 114. When I/O interface 110 receives a description of data to be printed, a bit map description of that data is provided by printer controller 112 and stored in memory 114. Formatter 118, reads the bit map description, prepares one or more halftone image descriptions, and may store the halftone image descriptions in memory 114. Formatter 118 also provides laser drive signal LD on line 119 to laser 144 for modulating laser beam 145 in accordance with the halftone image description to provide a hybrid halftone image.

A hybrid halftone image according to various aspects of the present invention, when used in printer 100, makes less apparent several process variables which otherwise may produce objectionable moire patterns in printed output. For example, individual facets of rotating mirror 146 may be offset a minute amount from being parallel with axis 147. Bearings used to support rotating mirror 146 may introduce movement of a facet that is not strictly parallel or concentric with axis 147. These and other known sources of error (collectively herein called scanner run-out) contribute to misdirection of beam 145 in the direction of the scan line and in the direction perpendicular to the scan line.

When more than one halftone image is used in overlaid registration, misregistration may give rise to an objectionable moire pattern. The registration of one halftone image with respect to another used collectively to provide one printed image (as in color printing) may be inexact. Inexactness may be due to numerous known mechanical and electrical process variables including, for example in printer 100, minor non-repeatability of rotations of photoconductive drum 148 and minor non-repeatability of rotations of transfer belt 152 (collectively herein called developer run-out). When the overlaid halftone images include one or more halftone images or hybrid halftone images provided in accordance with halftone supercells, discussed below, moire patterns may also be made less apparent.

Figure 2:
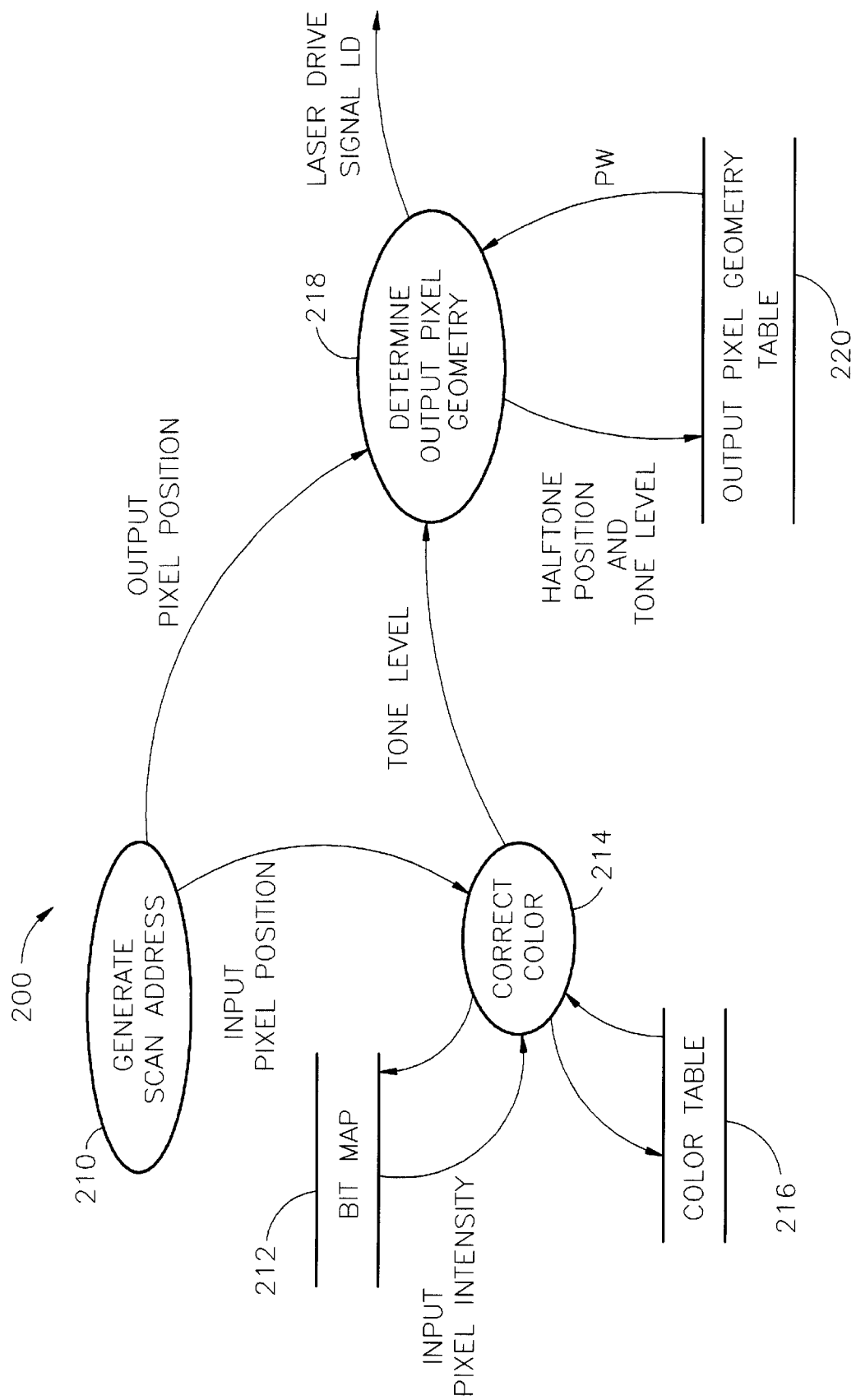
FIG. 2 is a data flow diagram of a process performed by the formatter of FIG. 1.

A process for providing a halftone image or a hybrid halftone image in accordance with various aspects of the present invention includes any process that determines a halftone dot in response to an output pixel geometry table. For example, process 200 of FIG. 2 is performed by formatter 118 to provide laser drive signal LD. Signal LD conveys indicia of an on/off (binary) modulation for laser 144 by time division multiplexing. In other words, at any particular time, signal LD identifies whether laser 144 is providing beam 145 or not providing a beam. Such consecutive particular times define a halftone dot for each halftone cell (or supercell) of a halftone image or a hybrid halftone image. The steps of process 200 may execute in parallel as data becomes available to respective steps.

At step 210, input pixel positions and output pixel positions, each as respective series of binary numbers for use as indices, are determined in accordance with the changing position of rotating mirror 146. Each input pixel position uniquely identifies one input pixel relative to a reference point in the input image. Intensities of input pixels defining an input image may be retrieved from a bit map array or may be developed according to an algorithm based on corresponding values of input pixel position. When bit map array values provide 8-bit intensity values for each of three color planes: red, green, and blue (RGB), one 8-bit intensity value in each respective color plane is identified by one input pixel position value. The series of input pixel positions identifies a scan line across the input image. Output pixel positions are provided according to a mapping of input pixel positions to output pixel positions. A conventional mapping provides a one-to-one correlation between input and output pixel positions, though other mappings may be used. When a one-to-one mapping is used, the scan line to be provided by laser 144 and mirror 147 may correspond to the scan line across the input image.

Figure 5:
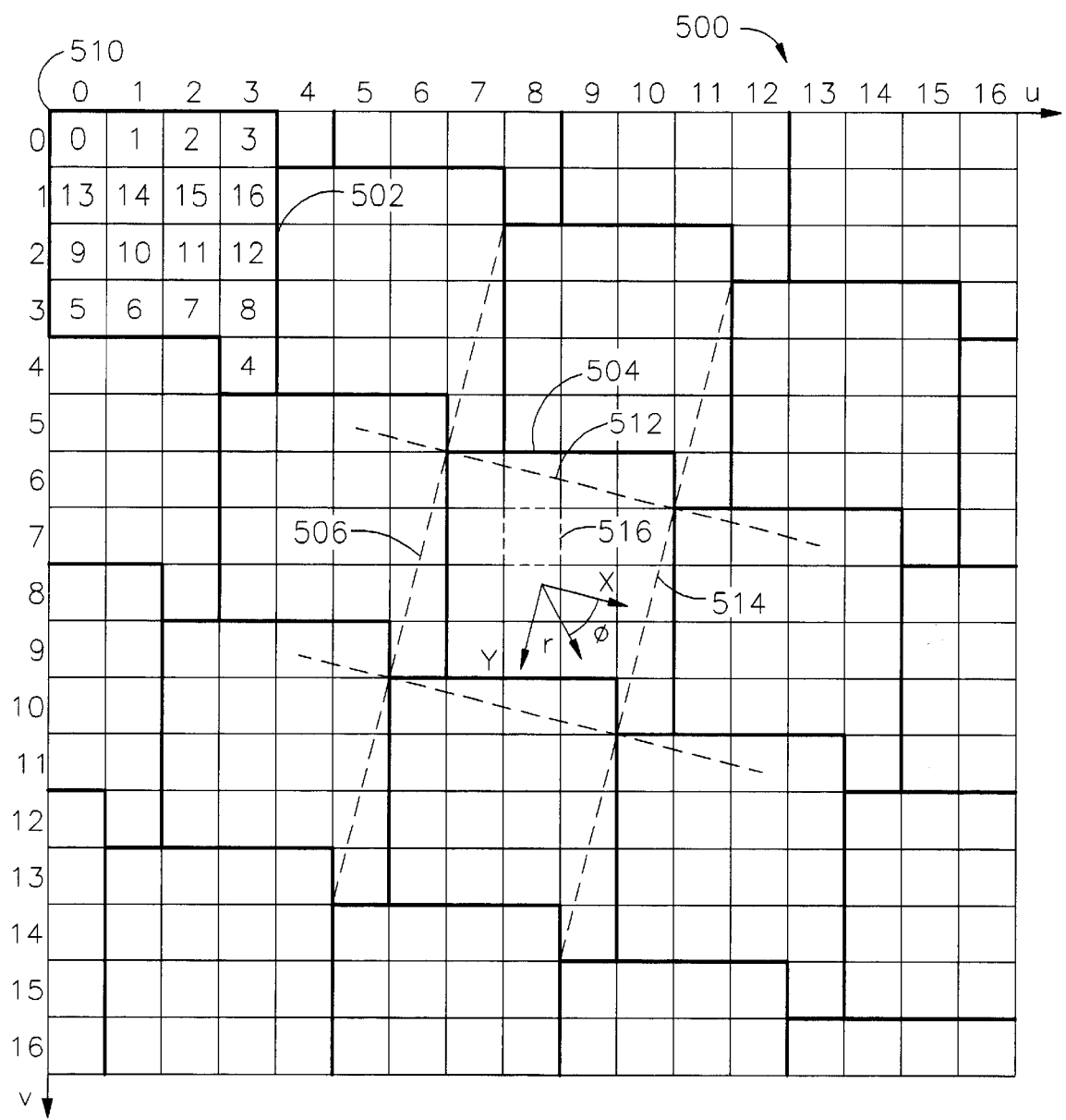
FIG. 5 is an output pixel grid referenced to axes (u,v) for defining halftone positions in halftone cells as referred to in FIG. 3.

Output pixel positions may be identified in a coordinate system having orthogonal axes, a unit of length along each axis corresponding to a pitch along the respective direction. For example, output pixel 516 of FIG. 5 is identified by coordinates (8,7) along u and v axes respectively. The physical separation of adjacent pixels along an axis defines a pitch in pixels per inch (ppi) for that axis, or equivalently, dots per inch (dpi). The term dots per inch does not refer to halftone dots but rather halftone positions, i.e., output pixel positions.

At step 214, a tone level for each output pixel is provided as a result of color conversion and correction. Color conversion and correction are accomplished simultaneously with reference to color table 216. Color table 216 may be any conventional object or array stored in memory 114. For example, input pixel position values are each respectively used as an index to retrieve a corresponding intensity value from bit map 212. Bit map 212 may be a conventional bit map object which may include processes (not shown) for expanding or compressing data in memory 114 to provide the corresponding intensity value. Data compression techniques may be used to reduce the need for expensive memory circuits in memory 114. In a variation, bit map 212 is merely an array of integers, each integer defining an intensity value.

A tone level (one of cyan, magenta, yellow, or black) is determined by using each intensity value (one of red, green, or blue) as an index into color table 216. Color table 216 provides the corresponding tone level according to prior calculations (e.g., cyan_tone=255−red_intensity, etc.) and corrected for transfer functions of the printing process and human visual sensitivity. For example, to achieve an incremental step in human visual sensitivity, more than a linearly proportional increase in laser drive pulse width may be needed to provide a suitable amount of toner to compensate for printer nonlinearity and nonlinearity of the average human visual sensitivity.

At step 218, for each output pixel position determined at step 210 and each corresponding tone level determined at step 214, an output pulse geometry is determined for a respective output pixel. Such a geometry may affect the size, shape, and/or position of dispensed toner relative to output pixel position dimensions. For example, the on/off state of laser 144 may be controlled by a pulse width and pulse position conveyed by signal LD. An output pulse width may be determined in accordance with an integer value pulse width PW obtained from output pixel geometry table 220. The pulse position may be fixed at the beginning of the scan of the respective output pixel, or preferably, centered in the time allotted to the respective output pixel.

In a variation of process 200, output pixel geometry values determined at step 218 are stored in a halftone image buffer and subsequently read from such a buffer by an additional process step. Storage of output pixel geometry values in such a halftone image buffer may facilitate more efficient operation of printer 100 by permitting processing of input pixels at a different rate or in a sequence different from the sequence being used for output scan lines.

Figure 6:
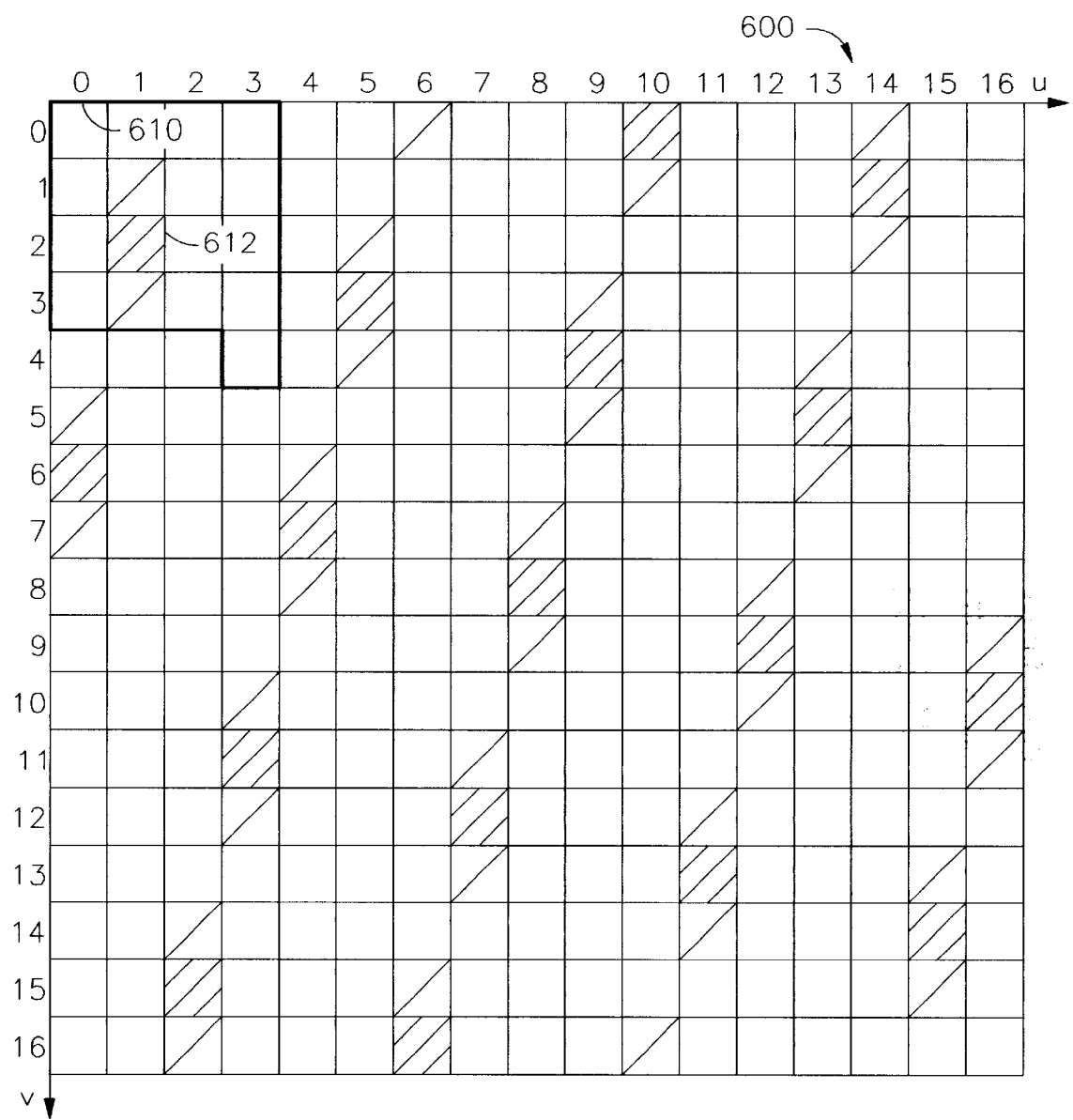
FIGS. 6 through 10 present output pixel grids referenced to axes (u,v) for a sequence of halftone images according to various aspects of the present invention.
Figure 7:
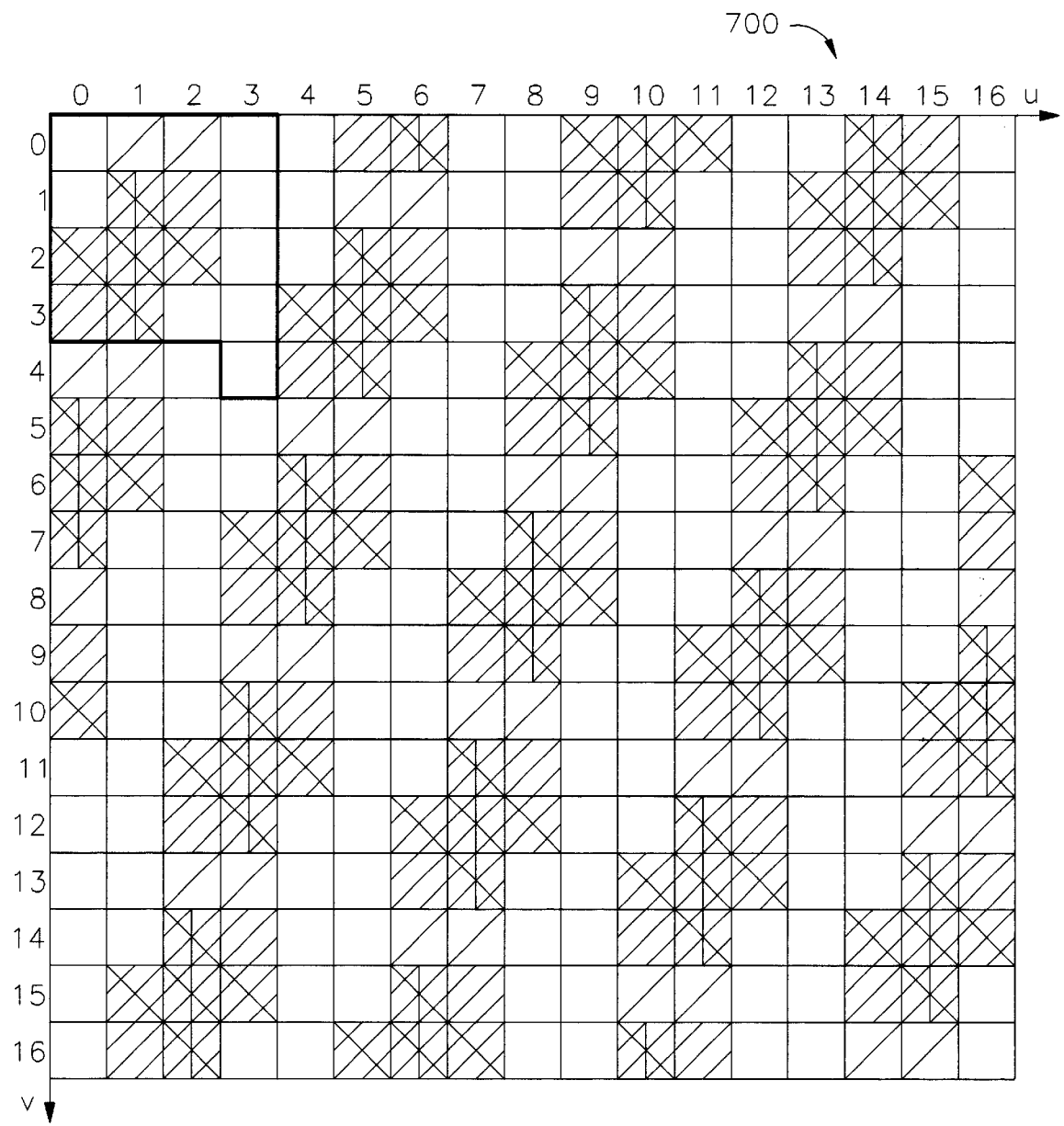
Figure 8:
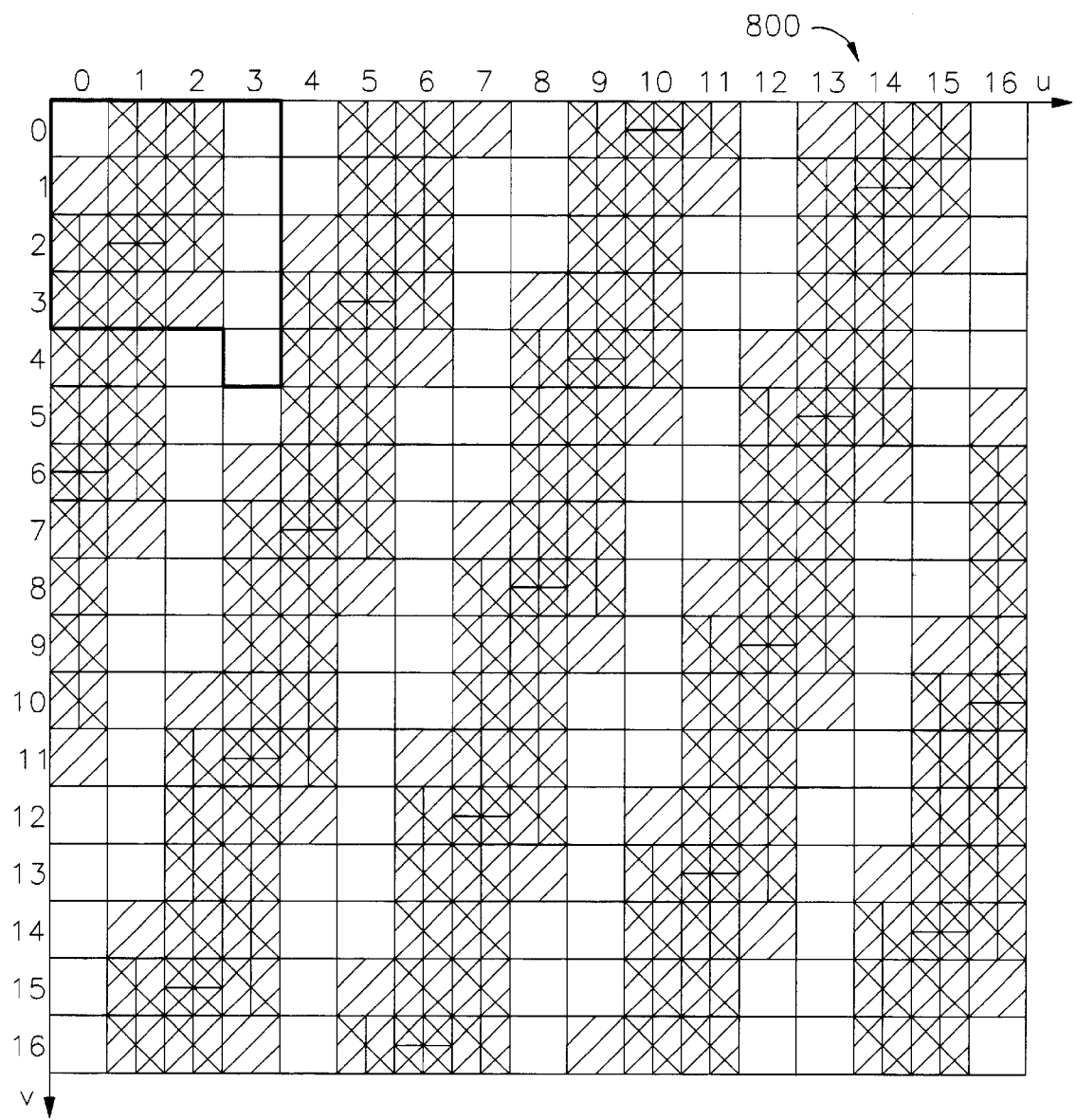
Figure 9:
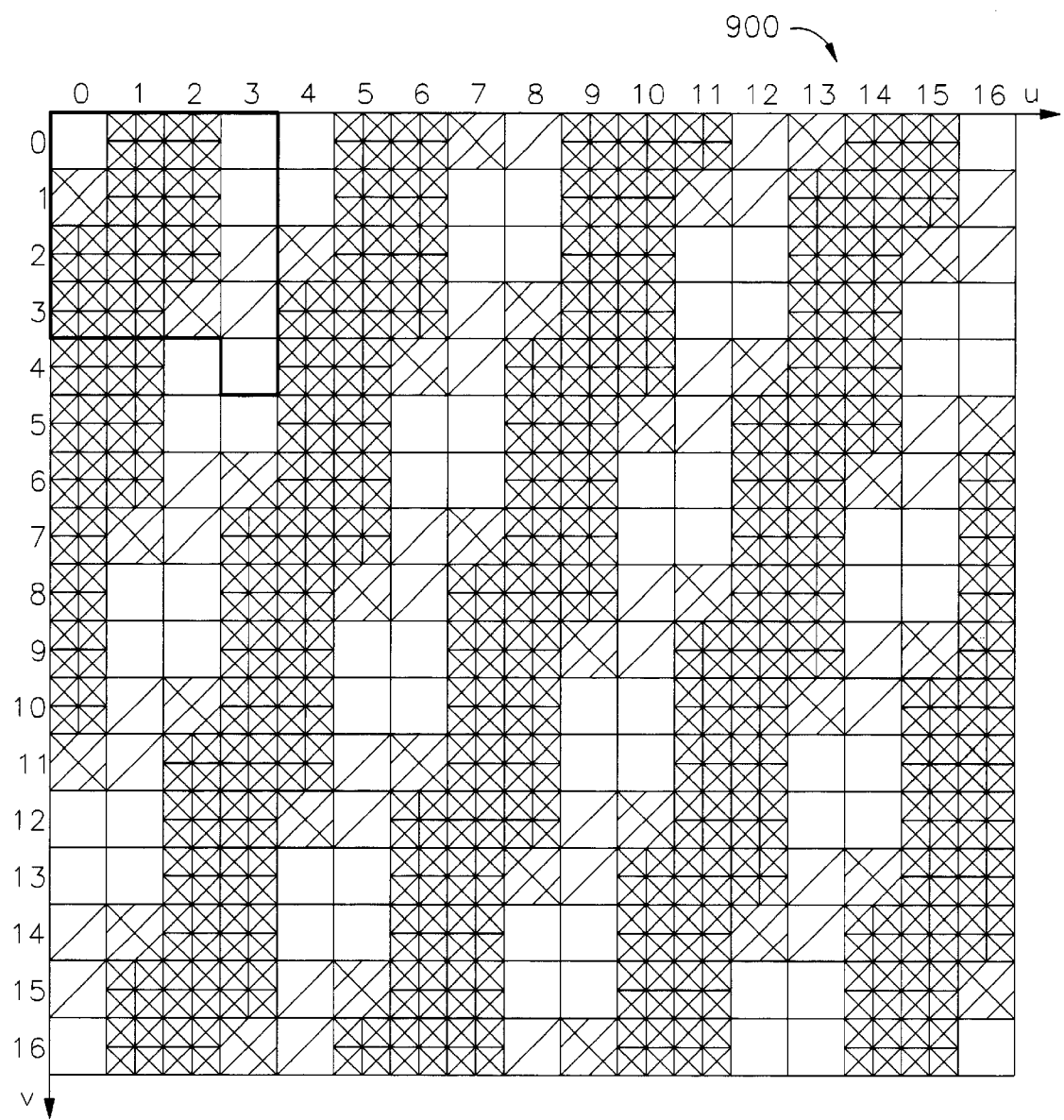
Figure 10:
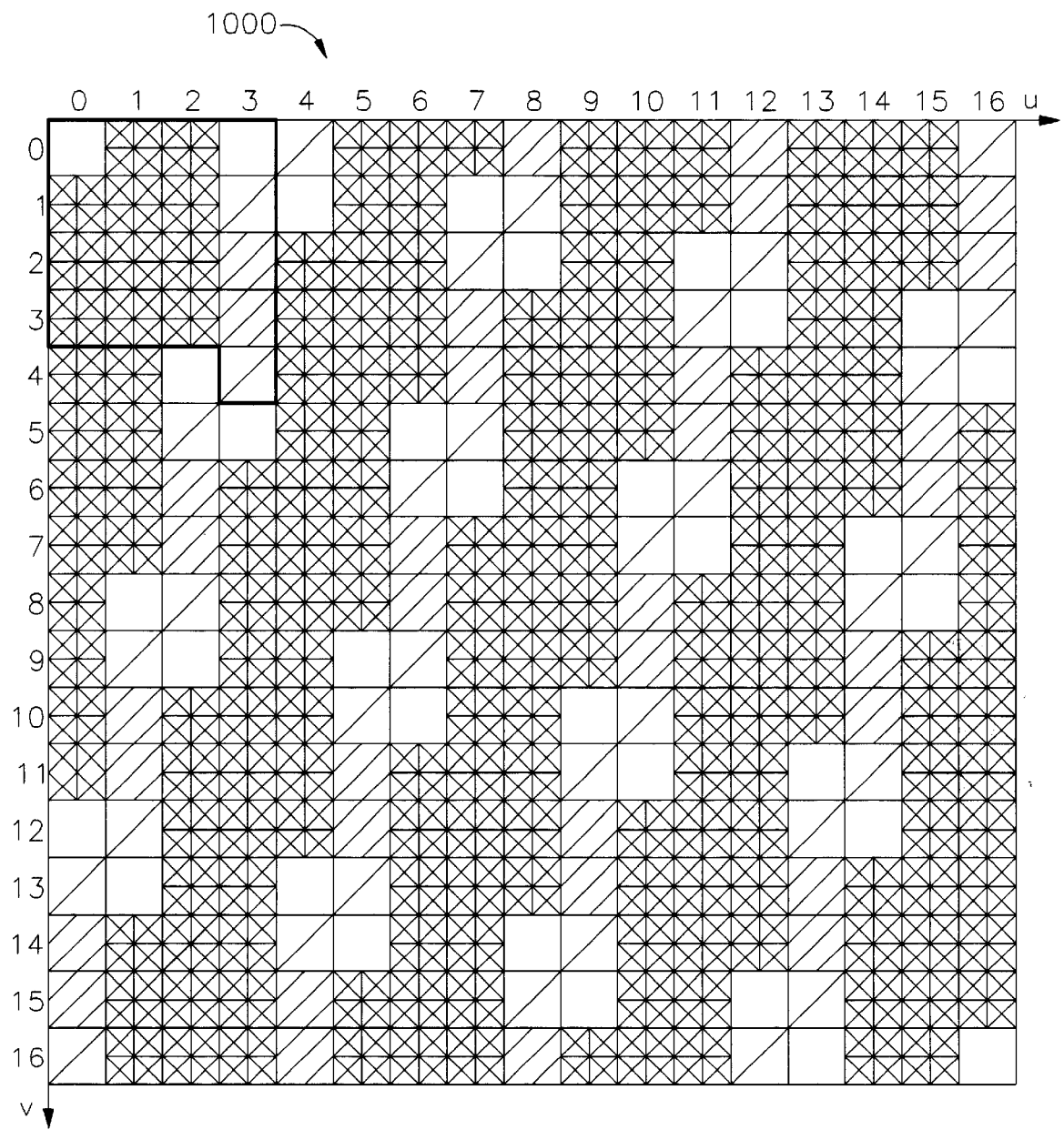

Each output pixel geometry value is determined, according to various aspects of the present invention, so as to form, at a particular output pixel, a portion of a particular halftone dot. A "halftone dot" is any group of output pixels in a halftone cell, regardless of the fact that the shape produced may be other than a circular dot. For example, the halftone cell of FIG. 5 having halftone position 0 at (0,0) may provide a halftone dot as a vertical shape as shown in FIG. 6 beginning at (1,1) and corresponding to output pixels (1,1), (1,2), and (1,3). As described below, the pulse width value for output pixel (1,1) differs from the pulse width value for output pixel (1,2) as indicated by a different cross-hatching in FIG. 6.

According to aspects of the present invention, any halftone cell (or supercell) suitable for tiling onto any output pixel grid may be used to define an output pixel geometry table. In a variation where output pixel geometry is not subject to variation (the pixel is merely on or off), the output pixel geometry table may include but one bit per halftone position and tone level. Any halftone position numbering sequence may also be used, provided that each column in the output pixel geometry table is identified to a halftone position of the halftone cell being used. Although one halftone cell shape is used in FIG. 5 to tile an entire output pixel grid, in a variation, a mix of halftone cells of different shapes are used to tile the output pixel grid.

An output pixel geometry table according to various aspects of the present invention includes any object or data representation for modulating a signal to convey a hybrid halftone image. For example, output pixel geometry table 220 may include pulse width array 300 of FIG. 3, indexed by halftone position and tone level. Halftone position, may be an integer that identifies a particular position in a halftone cell. Tone level, as determined at step 214 discussed above, may be an 8-bit integer. For each halftone position and tone level, a pulse width value PW may be read from pulse width array 300 in a conventional manner corresponding to the appropriate row/column intersection.

Operation of pulse width array 300 may be understood by an example of an input bit map (not shown) containing pixels that correlate one-to-one with pixels of an output pixel grid (as in FIGS. 5 and 6). Using the halftone cell positions defined in FIG. 5 for halftone cell 610, and assuming that a tone level of 4 has been determined for the input pixel corresponding to output pixel 612, the pulse width value 109 for modulating laser 144 at the time corresponding to output pixel 612 is identified at row 310 column 10. Row 310 corresponds to tone level 4. Column 10 corresponds to halftone position 10.

Pulse width values in pulse width array 300 are expressed as 8-bit integers in the range 0 to 255. As discussed below, some values may be omitted. Pulse width array 300, as shown, defines pulse widths for use with a halftone cell containing 17 halftone positions, such as shown in FIG. 5. Pulse width array 300 may be expanded or accessed via a translation step when more than one halftone image is to be provided, for example, a halftone image for each color CMYK. For example, when a second different halftone cell shape is used for a second halftone image, pulse width array 300 may be expanded to provide columns of pulse widths to be used with the halftone positions identified to the second halftone cell shape. Alternatively, when the second halftone cell has a shape that is related to the first halftone cell by a geometric operation including reflection, translation, rotation, or inversion, then the columns of pulse width array 300 may be accessed by the halftone positions in the second halftone cell after conversion to similarly situated halftone positions of the first halftone cell.

In a variation, a separate output pixel geometry table is used for each hybrid halftone image to be provided.

Figure 4:
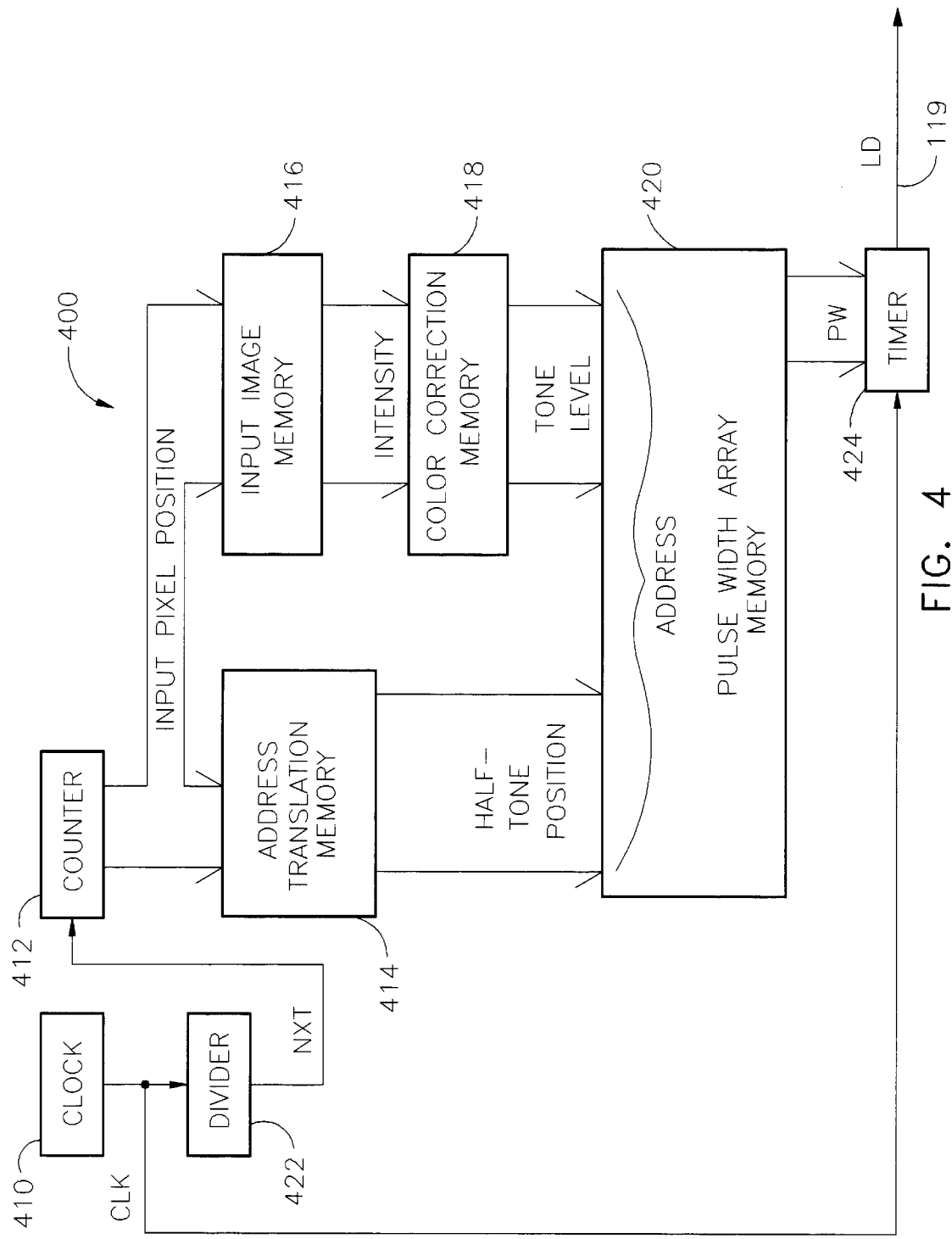
FIG. 4 is a functional block diagram of a portion of formatter 118 of FIG. 1.

A formatter according to various aspects of the present invention includes any logic circuit for performing process 200. A logic circuit generally performs such a process at a higher speed than possible with a general purpose processor. For example, formatter 118 includes logic circuit 400 of FIG. 4. Logic circuit 400 includes clock 410, counter 412, address translation memory 414, input image memory 416, color correction memory 418, pulse width array memory 420, divider 422, and timer 424.

In operation, clock 410 provides a periodic clock signal CLK having active edges. Each active edge of signal CLK advances divider 422 and timer 424. Divider 422 provides a signal NXT having active edges at a lower rate than those of signal CLK. Each active edge of signal NXT advances counter 412 to provide a next input pixel position signal. Divider 422 provides a delay between successive advances of counter 412 in accordance with a time TS allotted to scan across one output pixel position. Time TS may be defined as an 8-bit integer, for example 255, equal to or larger than the maximum pulse width value used in pulse width array 300.

The input pixel position signal addresses address translation memory 414 to provide a halftone position signal. The input pixel position signal also addresses input image memory 416 to provide an intensity signal. The intensity signal addresses color correction memory 418 to provide a tone level signal. The halftone position signal and tone level signal together address pulse width array memory 420 to provide a pulse width signal.

Timer 424 provides a pulse asserted for the time specified by signal PW and centered in the time slot allotted to the corresponding output pixel position. For example, when the time slot has a duration of TS, timer 424 counts active edges of signal CLK until a time (TS−PW)/2 has lapsed, then asserts laser drive signal LD for a time duration PW. A centered pulse width on signal LD on line 119, completes the exposure of one output pixel on drum 148 with a minimum of asymmetrical interaction with adjacent charges on the drum.

In a variation of circuit 400, the functions of counter 412 and address translation memory 414 are performed by a state machine or counter circuit that provides the input pixel position signal and the halftone position signal directly without intermediate address translation.

In a second variation, pulse width signals PW are stored in a halftone image buffer and subsequently used to provide an output scan line as discussed above.

A hybrid halftone image, according to various aspects of the present invention, includes any description of information for visual presentation provided in accordance with a hybrid screen function. A hybrid screen function, according to various aspects of the present invention, includes any process for determining a halftone dot in response to a first halftone function that exhibits symmetry about a point and a second halftone function that exhibits symmetry about a line. A halftone function includes any expression that defines a halftone dot for a range of tone level values. A halftone dot is said to "grow" over a range of tone level values as a way of describing the change in shape of the halftone dot proceeding from low tone level values to high tone level values.

A hybrid halftone dot according to various aspects of the present invention grows from a cluster of positions, to a line, to a thickened line, and finally to an inverse cluster of positions. Clusters of positions yield repeatable performance in electrophotographic processes, especially in rendering highlights and shadows. Lines yield repeatable performance especially in midtones. The combination of clusters and lines in the growth sequence of a hybrid halftone dot provides better overall accuracy of halftone rendition and lower likelihood of objectionable moire because lines are less sensitive to scanner run-out. In other words, hybrid halftone images are less likely to exhibit objectionable moiré when printed with scanner run-out.

For example, the hybrid halftone images 600, 700, 800, 900, 1000, and 1100 of FIGS. 6 through 10 respectively have a halftone dot defined in accordance with a sum of two halftone functions as described below. For simplicity of description, each image 600, 700, 800, 900, 1000, 1100, corresponds to an input bit map having all input pixels of the same intensity. Specifically, image 600 is tone level of 4 as in row 310 of FIG. 3, image 700 is tone level 65 as in row 312, image 800 is tone level 129 as in row 314, image 900 is tone level 193 as in row 316, and image 1000 is about tone level 230. Cross hatch patterns used in FIGS. 6 through 10 have a density corresponding roughly to the pulse width values of FIG. 3.

A screen function includes a mathematical expression for determining whether a particular output pixel in a halftone cell is to be "on". Recall that a binary output pixel may be either "on" (e.g., for attracting toner) or "off". However, in printer 100, each output pixel may take toner in a range of amounts (0–255). A smaller range may be used in a variation where toner particles are less numerous per output pixel.

A screen function for a hybrid halftone image for any device implementing an output pixel having a geometry that may be varied may include a mathematical expression for determining one of a range of geometry values for such an output pixel. Alternatively, the output pixel may be subdivided into a number of physical loci equivalent to the range, and a combination of screen function results from each loci may be used to determine a value for the output pixel within the range.

A method according to various aspects of the present invention determines output pixel geometry values for use in a table so that use of the table implements a hybrid halftone image based on halftone cells or halftone supercells. For example, pulse width values in pulse width array 300 were prepared according to the following method steps (a) through (k) for determining the geometry of an output pixel of a halftone cell.

(a) Select a set of rational tangent angles and a corresponding set of halftone cells. One halftone cell is to be defined for each halftone image to be used in overlaid relationship to other halftone images. Each halftone cell may be defined on the output pixel grid by two vectors originating at the origin of the (u,v) axes. Generally, the pair of vectors used to define a halftone cell may be given as two points $(u_1,v_1)$ and $(u_2,v_2)$. Perform steps (b) through (k) for each halftone cell shape.

Color printing, for example, may use 4 rational tangent angles. Two of these angles may be provided by one halftone cell shape, used in two different orientations, as discussed above. The third and fourth rational tangent angles may be provided by a different halftone cell shape. When desirable to use the same shape for two halftone images, the second image may use the same halftone cell, shifted horizontally or vertically. Steps (b) through (k) are then performed on each halftone cell shape, the output pixel intensity values for halftone cells having similar shape being determined by mapping as discussed above.

(b) Identify N halftone positions in the halftone cell as positions numbered 0 to (N−1). Each halftone position is identified by a value n.

In halftone cell 502 (and similarly 504) of FIG. 5, for example, N=17.

(c) Identify T tone levels for output pixel intensity numbered 0 to (T−1). Each tone level is identified by a value t.

For example, T=256 for tone levels of FIG. 3.

(d) Establish, a unit halftone cell (not shown) having a screening coordinate system with Cartesian coordinates (x,y) and polar coordinates (r,theta).

The origin of the x,y coordinate system may be selected to coincide with the origin of the u,v coordinate system. The unit halftone cell is rectangular and may be square. Unit halftone cells are theoretically tiled across halftone cells for convenience of calculating the hybrid screen function.

For halftone cell 504 of FIG. 5, parallelogram 506 may be defined having a center within one halftone position (i.e., position 10). By avoiding placing the center on a boundary between halftone positions, growth of the halftone dot may be more reliable, especially in electrophotographic printing processes. Parallelogram 506 for halftone cell 504 is constructed using vectors 512 and 514, which in the (u,v) coordinate system are defined as (4,1) and (−1,4), respectively. In parallelogram 506, a coordinate system is established at the center of the parallelogram defined by vectors 512 and 514. The x axis is parallel to and in the same direction as vector 512. The y axis is parallel to and in the same direction as vector 514. Conventional polar coordinates are defined from the intersection of the x and y axes.

The geometric transformation of the halftone cell parallelogram to the unit halftone cell extending from −0.5 to +0.5 in each axis (x,y) may be defined in terms of the given vectors $(u_1,v_1)$ and $(u_2,v_2)$ and additional relationships derived using conventional geometry:

alpha=arctan($v_1/u_1$)

beta=arctan($-u_2/v_2$)

$A_x$=alpha $B_x$=90−beta $C_x$=90−alpha+beta $A_y$=beta $B_y$=90−alpha $C_y$=90+alpha−beta $$P_x = \frac{\sin B_x}{\sin C_x} * \left(u_1 - \frac{v_2 u_2}{v_2}\right)$$

$$P_y = \frac{\sin B_y}{\sin C_y} * \left(v_2 - \frac{u_2 v_1}{u_1}\right)$$

$$x = \frac{1}{P_x}\left[\frac{\sin B_x}{\sin C_x}u + \frac{\sin A_y}{\sin C_y}v\right] - 0.5$$

-continued $$y = \frac{1}{P_y}\left[\frac{\sin B_y}{\sin C_y}v - \frac{\sin A_x}{\sin C_x}u\right] - 0.5$$

After evaluating x and y as a function of u and v above, x and y may be scaled using the integer-part function into to lie within the unit halftone cell as follows:

x=x−int(x)

y=y−int(y)

(e) Subdivide each halftone position into a number I of loci, each locus $L_i$ identified by its halftone position n, coordinates (u,v) relative to the output pixel grid, and Cartesian coordinates (x,y) and polar coordinates (r,theta) in the screening coordinate system. The number N*I is preferably equal to or greater than the number T of tone levels that may be used in any halftone image. Form a list having a row for each locus. For each row of the list, store the halftone position n, the coordinates (x,y), and the coordinates (r,theta) corresponding to the locus $L_i$(n).

For example, halftone position 516 of FIG. 5 is divided by a 15 by 17 grid (not shown) to form 255 loci (i.e., i ranging from 0 to 254). In a similar manner, each halftone position 0 through 16 of halftone cell 504 is subdivided. Loci that appear outside the corresponding unit halftone cell are conventionally mapped into the unit halftone cell. The total number of loci in the halftone cell is therefore 255*N or 4,335.

(f) Evaluate a hybrid screen function at each locus of each halftone position to determine a hybrid screen function result, for example, SF(x,y).

SF(x, y)=HPF(x, y)+HLF(|x|)

The exemplary hybrid screen function SF(x,y) provides a result in accordance with a sum of two halftone functions: a halftone point function HPF( ) and a halftone line function HLF( ). In a variation, a weighted sum of these functions is used.

A halftone point function according to various aspects of the present invention exhibits symmetry about a point. For example, the following exemplary function exhibits symmetry about the origin of the unit halftone cell.

HPF(x, y)=0.5[1−cos(π(x+y))*cos(π(y−x))]

Exemplary halftone point function HPF( ) as defined above produces a halftone dot of generally circular shape that produces in sequence a circle, a ring, a diamond, and a Maltese cross as it grows to fill the halftone cell.

A halftone line function according to various aspects of the present invention includes exhibits symmetry about a line. For example, the halftone line function defined in Table 1 as a piecewise linear function of the absolute value of x exhibits symmetry about the y axis of the unit halftone cell.

TABLE 1

| x | HLF (|X|) |
|---|---|
| 0 | 0 |
| ±0.05 | 0.075 |
| ±0.10 | 0.175 |
| ±0.15 | 0.300 |
| ±0.20 | 0.425 |
| ±0.25 | 0.550 |
| ±0.30 | 0.650 |
| ±0.35 | 0.725 |
| ±0.40 | 0.775 |
| ±0.45 | 0.825 |
| ±0.50 | 0.850 |

The exemplary halftone line function HLF( ) defined in Table 1 by itself would produce a halftone dot having a thin rectangular shape that initially stretches across a vertical extent through the center of the halftone cell and then widens only in the horizontal direction as it grows to fill the halftone cell.

(g) For each row of the list, store the hybrid screen function result SF(x,y) corresponding to the locus (x,y).

(h) Sort the rows of the list in ascending order by SF(x,y). For rows having the same value of SF(x,y), further sort in ascending order by r. For rows having the same value of SF(x,y) and r, further sort in ascending order by theta.

(i) Identify successive rows of the sorted list to each ascending tone level t in the range 0 to (T−1). One row is identified to each tone level t.

There are several ways to arrive at a mapping of tone levels to selected rows of the list. In a first way, every Nth row is selected. In a second way, the maximum value of SF(x,y) is successively multiplied by t/T as t ranges from 0 to T and the row having the first occurrence of the product as the value of SF(x,y) is selected. In a third way, a few rows at the extremes of the sorted list are discarded as unreliable to produce and the remaining rows are selected in accordance with a nonlinear function, for example to account for nonlinearities not accounted for by use of a color table as discussed above.

(j) Form an output pixel geometry table having a row for each tone level t and a column for each halftone position n. For each row/column entry, count the number of rows in the sorted list that identify the respective halftone position n up to the row selected in step (i) for the respective tone level t.

(k) Use the output pixel geometry table to produce a visual portrayal of halftone steps, one step for each tone level t. For tone levels which do not appear to differ proportionately, repeat steps (h) and (i) to obtain a visually linear halftone. Quantitative measurements of visual linearity may be made using a conventional reflectometer.

In a variation of the above method, step (a) may include selection of a halftone supercell in place of a halftone cell as discussed above. A halftone supercell, according to various aspects of the present invention, includes any number of output pixels grouped to form two or more halftone cells within the perimeter of the halftone supercell. Use of a halftone supercell permits selection of rational tangent angles for halftone images that will be overlaid from a wider range of angles than possible using halftone cells as discussed above. The selection of a particular set of angles defines a visual spacial frequency at which a moire pattern may become evident. By selecting a set of angles that provide a higher spacial frequency, a particular moiré pattern may become less evident and so become unobjectionable.

A halftone supercell according to various aspects of the present invention includes any arrangement of output pixels permitting subgroups of output pixels to be defined as a component halftone cell. For example, a halftone supercell may be defined by two vectors in a manner similar to a halftone cell definition, as discussed above with reference to vectors 512 and 514. The defining vectors of a halftone supercell (and similarly a halftone cell that is not a component of a supercell) originate and terminate at respective intersections in the (u,v) grid. By defining a number of component halftone cells within a halftone supercell, one or more component halftone cells is effectively defined by one or more vectors that do not originate and/or terminate at an intersection in the (u,v) grid. Such a component halftone cell may be referred to as an off-grid halftone cell. A rational tangent angle is related to the defining vectors of a halftone cell or component halftone cell. The rational tangent angles associated with a component halftone cell according to various aspects of the present invention differ from conventional angles and permit use of desirable higher visual spacial frequencies.

In such a variation, step (d) may be expanded to establish a coordinate system in each component halftone cell. In a first example, halftone supercell 1102 of FIG. 11 identifies 30 halftone positions. Similar halftone supercell 1103 identifies two component halftone cells 1104 and 1106 each with a coordinate system used for the respective screen function. In step (j) above, the output pixel geometry table for halftone supercell 1102 may be defined with 15 columns for the 15 halftone positions of component halftone cell 1104. These 15 columns may be mapped according to Table 2 for use with the remaining 15 positions of component halftone cell 1106.

TABLE 2

| Halftone Position in Halftone Cell 1104 | Corresponding Halftone Position in Halftone Cell 1106 |
| --- | --- |
| 0 | 21 |
| 1 | 20 |
| 15 | 6 |
| 16 | 5 |
| 17 | 4 |
| 7 | 29 |
| 8 | 28 |
| 9 | 27 |
| 10 | 26 |
| 22 | 14 |
| 23 | 13 |
| 24 | 12 |
| 25 | 11 |
| 2 | 19 |
| 3 | 18 |

Figure 12:
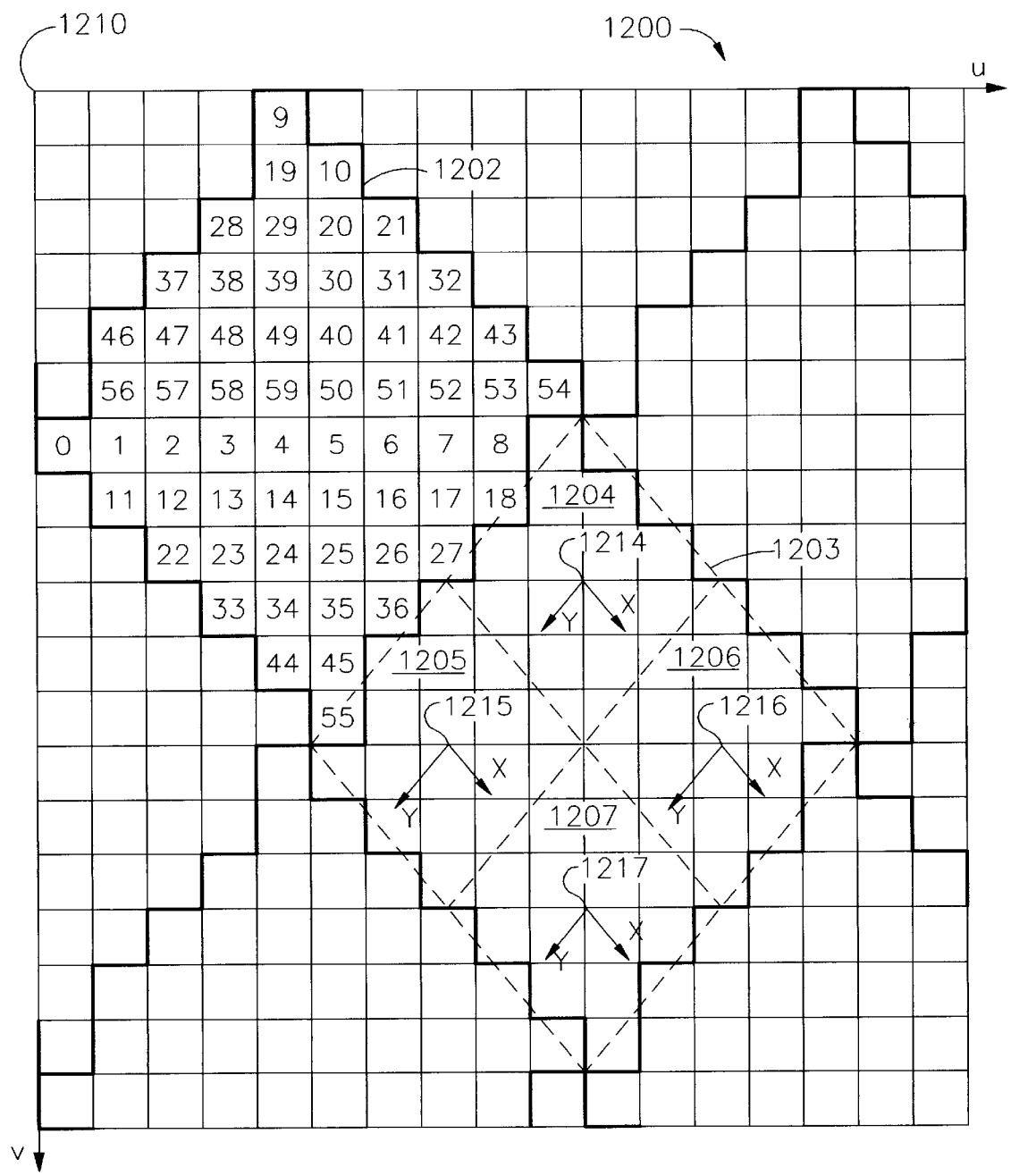

In a second example, supercell 1202 of FIG. 12 identifies 60 halftone positions. Similar halftone supercell 1203 identifies four component halftone cells 1204, 1205, 1206, and 1207 each with a coordinate system used for the respective screen function.

Several variations according to various aspects of the present invention may be realized by selecting various sets of halftone cells or halftone supercells to achieve minimal moiré in overlapping halftone images. These variations are identified in Tables 3, 4, and 5 wherein each halftone cell or halftone supercell is identified by its defining vectors given in (u,v) coordinates. In Table 3, use of hybrid halftone images for cyan and magenta provides desirable insensitivity to scanner run-out. Use of either set defined in Tables 4 and 5, without hybrid halftone images provides higher visual spacial frequency and less noticeable moiré patterns. Use of either set defined in Tables 4 and 5 with hybrid halftone images is preferred for insensitivity to scanner and developer run-out and less noticeable moiré patterns.

TABLE 3

| Set 1 | Halftone cell definition | Properties |
| --- | --- | --- |
| Cyan | (4, 1); (−1,4) as in FIG. 5 | angle of about 14 degrees from u-axis; about 146 lines per inch at 600 dpi |
| Magenta | (4, −1); (1, 4) similar to FIG. 5 | angle of about 76 degrees from u-axis; about 146 lines per inch at 600 dpi; |
| Yellow | (3, 3); (−3, 3) | angle of 45 degrees from u-axis; about 141 lines per inch at 600 dpi; |
| Black | (3, 3); (−3, 3); offset from yellow by (0, 3) | angle of 45 degrees from u-axis; about 141 lines per inch at 600 dpi; |

TABLE 4

| Set 2 | Halftone cell definition | Properties |
| --- | --- | --- |
| Cyan | halftone supercell defined by (7, 2); (−1, 4) as in FIG. 11 has two halftone cells defined by (3.5, 1); (−1, 4) | angle of about 16 degrees from u-axis; about 155 lines per inch at 600 dpi |
| Magenta | halftone supercell defined by (7, −2); (1, 4) similar to FIG. 11 has two halftone cells defined by (3.5, −1); (1, 4) | angle of about −16 degrees angle from u-axis; about 155 lines per inch at 600 dpi |
| Yellow | halftone supercell defined by (5, 6); (−5, 6) similar to FIG. 11 has four halftone cells defined by (2.5, 3); (−2.5, 3) | angle of about 50 degrees from u-axis; about 155 lines per inch at 600 dpi |
| Black | halftone supercell defined by (5, 6); (−5, 6) similar to FIG. 11 has four halftone cells defined by (2.5, 3); (−2.5, 3); offset from yellow by (0, 3) | angle of about 50 degrees from u-axis; about 155 lines per inch at 600 dpi |

TABLE 5

| Set 3 | Halftone cell definition | Properties |
| --- | --- | --- |
| Cyan | halftone supercell defined by (11, 3); (3, 11) has four halftone cells defined by (5.5, 1.5); (1.5, 5.5) | angle of about 15 degrees from u-axis; about 113 lines per inch at 600 dpi |
| Magenta | halftone supercell defined by (11, −3); (−3, 11) has four halftone cells defined by (5.5, −1.5); (−1.5, 5.5) | angle of about 165 degrees from u-axis; about 113 lines per inch at 600 dpi |
| Yellow | halftone supercell defined by (7, 7); | angle of 45 degrees from u-axis; about |

TABLE 5-continued

| Set 3 | Halftone cell definition | Properties |
|---|---|---|
| Black | (−7, 7) has four halftone cells defined by (3.5, 3.5); (−3.5, 3.5) | 121 lines per inch at 600 dpi |
| | halftone super cell defined by (7, 7); (−7, 7) has four halftone cells defined by (3.5, 3.5); (−3.5, 3.5); offset from yellow by (0, 3.5) | angle of 45 degrees from u-axis; about 121 lines per inch at 600 dpi |

While it is preferred to use a hybrid function with each of sets 1, 2, and 3, systems and methods in variations according to the present invention use conventional halftone screen functions in place of the hybrid screen functions for the preparation of values for an output pixel geometry table.

In laser printers, output pixel placement on the photoconductive drum may be subject to nonlinear interactions between adjacent output pixels. These and related nonlinearities may give rise to nonuniform placement of the respective halftone dots of adjacent halftone cells. For example, when halftone supercells are tiled across the output pixel grid, a distance between adjacent centers of halftone dots may differ across a boundary between halftone supercells.

Figure 11:
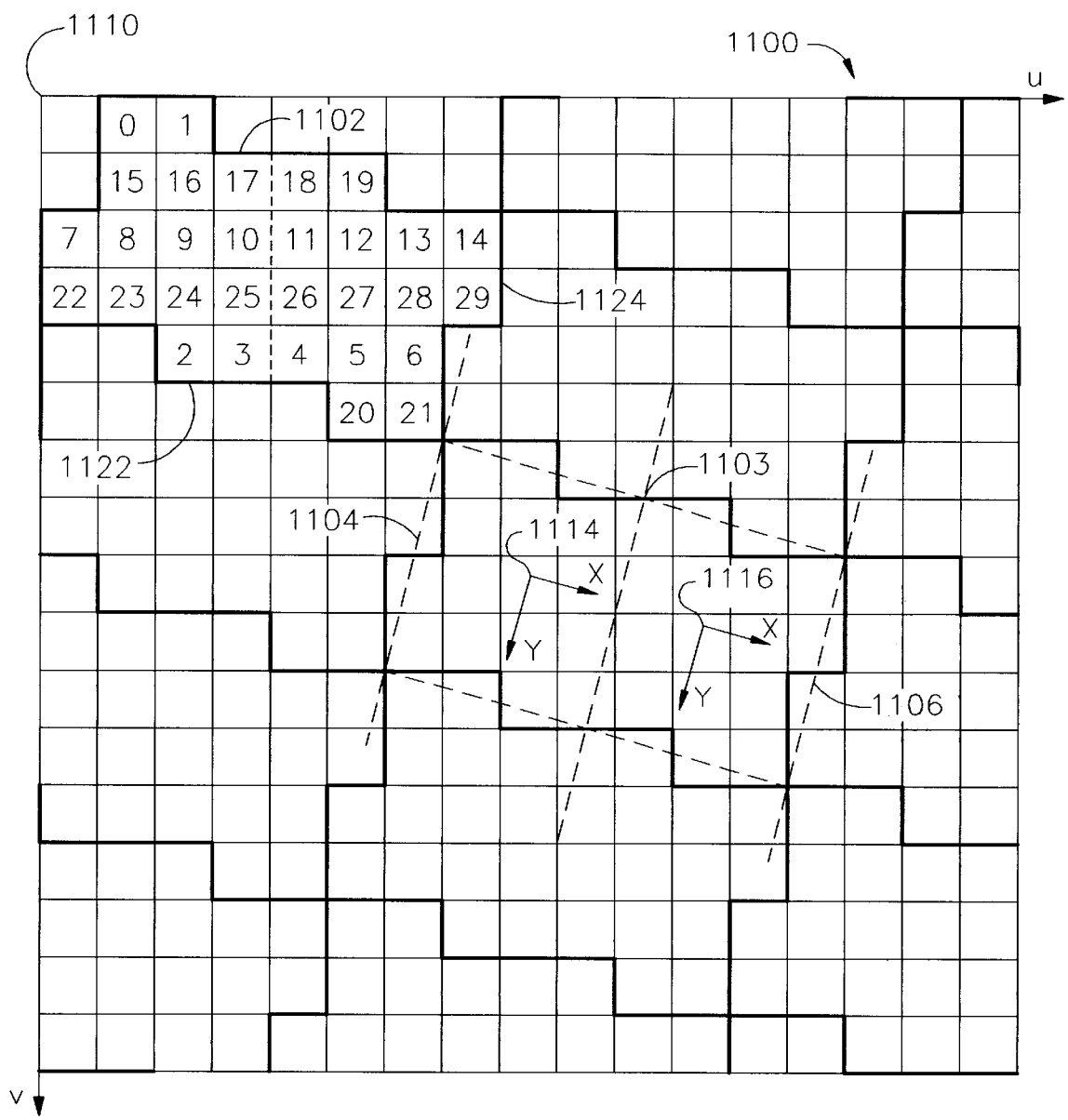
FIGS. 11 and 12 present output pixel grids referenced to axes (u,v) for defining alternate halftone cells and respective halftone positions in each cell which may be used for a set of halftone images to be overlaid.

In a variation of a method for determining output pixel geometry values, the list formed in step (e) is corrected to account for any difference between adjacent centers of halftone dots. Without the correction, modulated spacings may produce an undesirable visible effect. For instance, halftone dots may not be properly centered on the origin of the screen function coordinate system. In FIG. 11, a halftone dot designed to be centered at origins 1114 may in fact be closer to a halftone dot designed to be centered at origin 1116 than to a halftone dot designed to be centered at the origin of an adjacent halftone component cell across a halftone supercell boundary. As another example, halftone dots designed to be centered at origins 1214, 1215, 1216, and 1217 may be irregularly separated from each other or irregularly separated from adjacent halftone dots of other halftone component cells across a halftone supercell boundary.

In a variation that accommodates a correction, according to various aspects of the present invention, the following additional steps are introduced between step (e) and step (f).

(e1) Select tone levels at which the undesirable effect is to be corrected.

For example, beginning at tone level 16, every fourth tone level (16, 20, 24, 28, etc.) is selected for a total of nine tone levels in a range of 32 tone levels.

(e2) Expand rows of the list formed at step (e) by adding three columns in each row for storing a screen function result and correction terms for each respective locus of a selected tone level and between selected tone levels. Correction terms for coordinates (x,y) of the respective locus are designated herein ($dx_i$, $dy_i$).

For example, for the nine tone levels selected in the example above in a system having 64 uniformly spaced integer tone levels and 255 loci for each of 17 halftone positions, columns are added to the list for about 9*{(255*17)/64} rows.

(e3) Measure and store in the list the $dx_i$ and/or $dy_i$ values for the selected tone levels that appear to be responsible for the undesirable visual effect.

Continuing with the above example of selected tone levels, 9 measurements are made of $dx_i$ for variation along the x axis as in FIG. 11; or, 18 measurements for $dx_i$ and $dy_i$ for variation along both x and y axes as in FIG. 12.

(e4) Evaluate the screen function (conventional or hybrid) at each expanded row of the list and store its value temporarily in the respective row of the list.

(e5) Determine $dx_i$ and/or $dy_i$ for all expanded rows by interpolation between measured values from step (e3) and successive screen function values from step (e4).

(e6) For each expanded row of the list, revise the (x,y) coordinates for the respective locus according to the expressions:

$$x=x+(2*dx_i*\{0.5-|x|\})$$

$$y=y+(2*dy_i*\{0.5-|y|\})$$

(e7) For each expanded row of the list and with reference to the revised coordinates (x,y), recalculate coordinates (r,theta) and the screen function for storage in the list as expected for step (f) of the original method. When the method is continued from step (f) as discussed above, the revised coordinates (x,y) may have the effect of placing the expanded row at a different position in the sorted list. Consequently, a corrected output pixel geometry value may be assigned for one or more tone levels to reduce the undesirable effect.

While the present invention has been described in terms of several preferred embodiments, variations within the scope of the claims may become apparent in light of the drawing and description above. The present invention is intended to be defined only by the recited limitations of the claims, and equivalents thereof, rather than by the drawing and description of preferred exemplary embodiments.

What is claimed is:

1. A method of forming a halftone image in accordance with a description of data to be printed, the image comprising a plurality of image pixels, the method comprising determining an intensity of each image pixel in accordance with a screen function of the description, the screen function comprising a first function that exhibits symmetry about a point and a second function that exhibits symmetry about a line.

2. The method of claim 1 wherein the screen function comprises a sum of the first function and the second function.

3. The method of claim 1 wherein:
   a. each image pixel has a respective position identified to coordinates {x,y}; and
   b. the first function provides the respective intensity in accordance with the expression:

$$1-\cos(pi*(x+y))*\cos(pi*(y-x)).$$

4. The method of claim 1 wherein:
   a. each image pixel has a respective position identified to coordinates {x,y}; and
   b. the second function provides the respective intensity in accordance with a piecewise linear function of the absolute value of x.

5. The method of claim 1 further comprising modulating a laser in accordance with each image pixel intensity to render the halftone image on media.

6. The method of claim 1 wherein:
   a. the halftone image is formed with reference to:
      (1) a grid, each image pixel being a unit area of the grid, the grid having a pitch; and (2) a halftone cell bounded by a vector having a component along an axis of the grid, the component having a length that is a noninteger multiple of the pitch, each image pixel having a corresponding halftone cell position in the halftone cell; and b. determining is further in accordance with the screen function of the respective halftone cell position.

7. The method of claim 6 wherein the noninteger multiple is an integer multiple of one half of the pitch.

8. The method of claim 7 wherein the vector makes an angle of about 16 degrees from the axis.

9. The method of claim 6 wherein the vector has a second component along a second axis of the grid, the second component having a length that is a noninteger multiple of the pitch.

10. The method of claim 9 wherein the vector makes an angle of about 15 degrees from the axis.

11. The method of claim 6 wherein:

a. the description of the data to be printed comprises a plurality of pixel intensity values;

b. the method further comprises determining a respective tone level as a nonlinear function of a respective pixel intensity value; and c. determining the intensity of each image pixel is further in accordance with the respective tone level.

12. A system for providing a halftone image in response to a description of data to be printed, the system comprising:

a. a print engine for forming the halftone image on media in response to indicia that determine the image; and b. a formatter comprising a circuit that provides to the print engine the indicia in accordance with a screen function of the description of the data to be printed, the screen function comprising:

(1) a first function that exhibits symmetry about a point; and (2) a second function that exhibits symmetry about a line.

13. The system of claim 12 wherein the screen function comprises a sum of the first function and the second function.

14. The system of claim 12 wherein:

a. the halftone image comprises a plurality of image pixels, each image pixel having an image pixel position having coordinates {x,y}; and b. the first function provides the indicia in substantial accordance with the expression:

1−cos(pi*(x+y))*cos(pi*(y−x)).

15. The system of claim 12 wherein:

a. the halftone image comprises a plurality of image pixels, each image pixel having an image pixel position having coordinates {x,y}; and b. the second function provides the indicia in substantial accordance with a piecewise linear function of the absolute value of x.

16. The system of claim 12 wherein:

a. the print engine comprises a laser for rendering the image; and b. the laser is modulated in response to the indicia.

17. The system of claim 12 wherein:

a. the halftone image is formed with reference to:

(1) a grid, each image pixel being a unit area of the grid; and (2) a halftone cell bounded by a vector having a component along an axis of the grid, the component having a length that is a noninteger multiple of the pitch, each image pixel having a corresponding halftone cell position in the halftone cell; and b. the circuit determines the indicia in further accordance with the respective halftone cell position.

18. The system of claim 17 wherein the noninteger multiple is an integer multiple of one half of the pitch.

19. The system of claim 18 wherein the vector makes an angle of about 16 degrees from the axis.

20. The system of claim 17 wherein the vector has a second component along a second axis of the grid, the second component having a length that is a noninteger multiple of the pitch.

21. The system of claim 20 wherein the vector makes an angle of about 15 degrees from the axis.

22. The system of claim 17 wherein:

a. the description of the data to be printed comprises a plurality of pixel intensity values;

b. the circuit further determines a respective tone level for each pixel intensity value; and c. the circuit determines the indicia in further accordance with the respective tone level.

23. The system of claim 12 wherein:

a. the system further comprises a memory that provides a plurality of image pixel geometry values, each image pixel geometry value being defined in accordance with the screen function and being identified to a respective image pixel position; and b. the circuit provides the indicia to the print engine by performing a method comprising:

determining an image pixel position;

reading, in response to the description of the data to be printed and to the determined image pixel position, a respective output pixel geometry value from the memory; and providing the indicia corresponding to the determined image pixel position in accordance with the respective image pixel geometry value.

24. The system of claim 23 wherein:

a. each image pixel geometry value is further identified to a halftone cell position; and b. reading is further responsive to the respective halftone cell position.

25. The system of claim 23 wherein:

a. the description of the data to be printed comprises a plurality of pixel intensity values;

b. the method further comprises determining a respective tone level as a nonlinear function of a respective pixel intensity value; and c. reading is further responsive to the respective tone level.

26. A memory having stored therein a plurality of pixel geometry values, each pixel geometry value determined according to a method comprising:

selecting a plurality of image pixels to be members of a halftone cell, each selected image pixel being identified to a halftone cell position of the halftone cell;

identifying a plurality of loci for each halftone cell position;

calculating a respective result of evaluating a screen function at each locus, the screen function comprising a first function of the locus exhibiting symmetry about a point and a second function of the locus exhibiting symmetry about a line;

identifying each respective result to a tone level of a plurality of tone levels;

for each particular tone level, determining a respective pixel geometry value in accordance with a respective quantity of results identified to the particular tone level, whereby an image pixel intensity is determined in accordance with a pixel geometry value that is accessed from the memory in accordance with a desired halftone cell position and a desired tone level.

27. A memory having stored therein a plurality of pixel geometry values, the pixel geometry values for determining the intensity of corresponding image pixels, the image pixels being identified on a grid having a pitch, each pixel geometry value determined according to a method comprising:

selecting a plurality of image pixels to be members of a halftone cell, each selected image pixel being identified to a halftone cell position of the halftone cell, the halftone cell being defined by a vector having a component along an axis of the grid, the component having a length that is a noninteger multiple of the pitch;

identifying a plurality of loci for each halftone cell position;

calculating a respective result of evaluating a screen function at each locus;

identifying each respective result to a tone level of a plurality of tone levels;

for each particular tone level, determining a respective pixel geometry value in accordance with a respective quantity of results identified to the particular tone level, whereby an image pixel intensity is determined in accordance with a pixel geometry value that is accessed from the memory in accordance with a desired halftone cell position and a desired tone level.

* * * * *